(12) United States Patent
Shimizu et al.

(10) Patent No.: US 9,306,677 B2
(45) Date of Patent: Apr. 5, 2016

(54) UNDERWATER COMMUNICATION SYSTEM

(75) Inventors: Etsuro Shimizu, Tokyo (JP); Masayoshi Ozawa, Tokyo (JP)

(73) Assignee: NATIONAL UNIVERSITY CORPORATION TOKYO UNIVERSITY OF MARINE SCIENCE AND TECHNOLOGY, Tokyo (JP)

( * ) Notice: Subject to any disclaimer, the term of this patent is extended or adjusted under 35 U.S.C. 154(b) by 190 days.

(21) Appl. No.: 14/345,015

(22) PCT Filed: Sep. 14, 2012

(86) PCT No.: PCT/JP2012/073681
§ 371 (c)(1),
(2), (4) Date: Jun. 4, 2014

(87) PCT Pub. No.: WO2013/039222
PCT Pub. Date: Mar. 21, 2013

(65) Prior Publication Data
US 2014/0340995 A1    Nov. 20, 2014

(30) Foreign Application Priority Data
Sep. 16, 2011  (JP) .................................. 2011-203650

(51) Int. Cl.
H04B 13/02    (2006.01)
(52) U.S. Cl.
CPC ...................................... H04B 13/02 (2013.01)
(58) Field of Classification Search
CPC ........................................................ H04B 13/02
See application file for complete search history.

(56) References Cited

U.S. PATENT DOCUMENTS

| 8,160,635 B2 | 4/2012 | Sato |
| 2002/0003584 A1 | 1/2002 | Kossin |

(Continued)

FOREIGN PATENT DOCUMENTS

| CA | 2852392 A1 * | 3/2013 | ............. H04B 13/02 |
| CN | 1976252 A | 6/2007 | |

(Continued)

OTHER PUBLICATIONS

International Preliminary Report on Patentability for Application No. PCT/JP2012/073681 mailed Mar. 27, 2014 (5 pages).

(Continued)

*Primary Examiner* — Daniel Pihulic
(74) *Attorney, Agent, or Firm* — Nutter McClennen & Fish LLP; John J. Penny, Jr.

(57) ABSTRACT

Problem to be Solved
To provide an underwater communication system in which no holes need to be drilled in a shell body of a hermetically-sealed structure whose object is to operate underwater.
Solution
The underwater communication system includes:
 a hermetically-sealed structure 2 including a shell body 5 having a watertight structure and that is disposed underwater;
 a transmission unit 9 that is arranged in the hermetically-sealed structure 2 and that can perform wireless transmission;
 a non-conductive propagation medium 4 that includes one end portion being brought into contact with the outside of the shell body 5 having the watertight structure without making a hole therein; and
 a reception unit 10 that receives an electrical signal wirelessly transmitted from the transmission unit 9 from the other end portion of the propagation medium 4 that is located distally from the shell body 5.

17 Claims, 13 Drawing Sheets

(56) References Cited

U.S. PATENT DOCUMENTS

| | | | | |
|---|---|---|---|---|
| 2010/0173595 | A1* | 7/2010 | Sakurai | H01P 3/122 455/101 |
| 2014/0340995 | A1* | 11/2014 | Shimizu | H04B 13/02 367/131 |
| 2015/0301206 | A1* | 10/2015 | Shimizu | G01B 7/00 367/15 |

FOREIGN PATENT DOCUMENTS

| | | | | | |
|---|---|---|---|---|---|
| CN | 101064570 | A | | 10/2007 | |
| CN | 101557127 | A | | 10/2009 | |
| CN | 101783430 | A | | 7/2010 | |
| CN | 102052917 | A | | 5/2011 | |
| CN | 103814536 | A * | | 5/2014 | H04B 13/02 |
| EP | 2757710 | * | | 6/2015 | H04B 13/02 |
| JP | 08-202445 | A | | 8/1996 | |
| JP | 11-249734 | A | | 9/1999 | |
| JP | 11-355219 | A | | 12/1999 | |
| JP | 2001-308766 | A | | 11/2001 | |
| JP | 2005-020422 | A | | 1/2005 | |
| JP | 2005-244262 | A | | 9/2005 | |
| JP | 2005-328319 | A | | 11/2005 | |
| JP | 2009-055408 | A | | 3/2009 | |
| JP | 2009-260756 | A | | 11/2009 | |
| JP | 2010-178255 | A | | 8/2010 | |
| JP | WO 2013039222 | A1 * | | 3/2013 | H04B 13/02 |
| WO | 2009/138800 | A1 | | 11/2009 | |
| WO | WO 2015016379 | A1 * | | 2/2015 | H04B 13/00 |

OTHER PUBLICATIONS

International Search Report for Application No. PCT/JP2012/073681 mailed Nov. 13, 2012 (1 page).

Extended European Search Report for Application No. 12831517.3, issued May 13, 2015 (7 pages).

Chinese Office Action Application No. 201280045077.X issued Oct. 27, 2014 (13 pages).

Canadian Office Action for Application No. 2,852,392, issued Jun. 17, 2015 (4 pages).

* cited by examiner

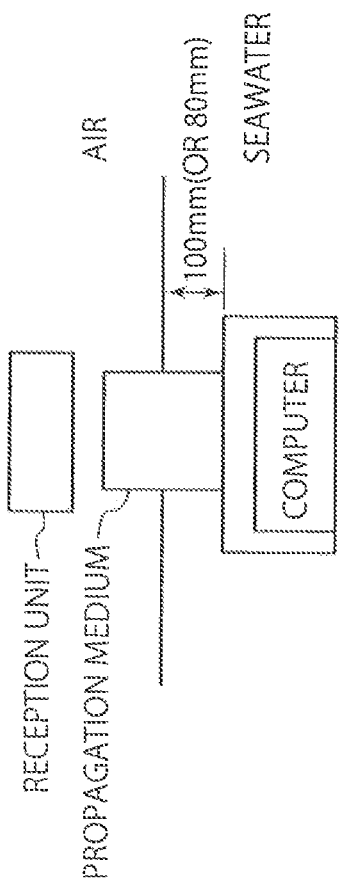

| PROPAGATION MEDIUM | IN AIR 500mm | IN SEAWATER 30mm | NR NATURAL RUBBER | SBR STYRENE BUTADIENE RUBBER | NBR ACRYLO-NITRILE BUTADIENE RUBBER | CR POLY-CHLORO-PRENE RUBBER | EPDM ETHYLENE PROPYLENE RUBBER | Q METHYL VINYL SILICONE RUBBER | POLYVINYL CHLORIDE | POLY-ETHYLENE | POLY-PROPYLENE | CERAMIC (BRICK) |
|---|---|---|---|---|---|---|---|---|---|---|---|---|
| CONDUCTIVITY | - | - | NON-CONDUCTIVE | NON-CONDUCTIVE | NON-CONDUCTIVE | NON-CONDUCTIVE | NON-CONDUCTIVE | NON-CONDUCTIVE | NON-CONDUCTIVE | NON-CONDUCTIVE | NON-CONDUCTIVE | NON-CONDUCTIVE |
| PERMITTIVITY | - | - | 2.0-3.0 | 2.9-3.0 | 15-20 | 7.5 | 3.1-3.4 | 3.2-10.0 | | | | |
| RECEIVED RADIO WAVE INTENSITY (dB) | -30 | lost | -65 | -61 | -64 | -62 | -61 | -62 | -77 | -77 | -77 | -70 |

FIG. 3A

| PROPAGATION MEDIUM | ACRYLIC | POLYACETAL | POLY-CARBONATE | BAKELITE (R) | POLYESTER | GLASS (GLASS EPOXY) |
|---|---|---|---|---|---|---|
| RECEIVED RADIO WAVE INTENSITY (dB) | -65 | -70.5 | -72.5 | -80 | -85 | -82.5 |

UNDERWATER COMMUNICATION SYSTEM

This application is a national stage of PCT/JP2012/073681 filed Sep. 14, 2012 which claims priority to Japanese Patent Application Number 2011-203650 filed Sep. 16, 2011, hereby incorporated by reference.

TECHNICAL FIELD

The present invention relates to an underwater communication system, and in particular, relates to an underwater communication system that allows a radio wave signal wirelessly emitted from a transmission device in a hermetically sealed container to be propagated to the outside by bringing a non-conductive propagation medium into contact with a shell body from the outside of it.

BACKGROUND ART

In general, it is known that a radio wave is significantly attenuated in water with distance.

For this reason, there have been proposed various underwater communication systems.

Since a radio wave has a property of being attenuated in water, there have been proposed many communication systems that use an ultrasonic wave or light instead of a radio wave.

Since an ultrasonic wave or light is less significantly attenuated underwater than a radio wave, communication can be performed also underwater by a communication system and a communicating method that use an ultrasonic wave or light.

Alternatively, there have been proposed underwater communication systems that use a radio wave.

In the case where a radio wave is used for underwater communication, a wired telecommunication cable is typically arranged between communication devices to preclude the attenuation in water.

However, the wired telecommunication cable is inconvenient to handle, and to avoid the inconvenience, there has also been proposed an air passage formed between communication devices (Japanese Patent Laid-Open No 11-355219).

Alternatively, for the purpose to avoid the inconvenience of the wired telecommunication cable likewise, there has also been proposed a self-propelled relaying device provided between communication devices (Japanese Patent Laid-Open No. 2001-308766).

Now, there have been proposed various autonomous unmanned underwater robots that perform various operations underwater.

In general, since apparatuses such as batteries, control devices, and cameras tend to malfunction in nature when being exposed to water (non-water resistance), early type underwater robots have been constructed to contain all non-water-resistant apparatuses in a common water-resistant-pressure-resistant container (in a hull), and project an operation arm or a propulsion device from a required portion.

However, since a plurality of the propulsion devices or the like need to be spaced at a distance, the common water-resistant-pressure-resistant container that contains all the apparatuses has to be made large, which causes a problem of useless spaces arising in the container.

Hence, there have subsequently been developed and proposed modularized underwater robots.

In this modularized underwater robot, a single-function module such as an operation device, a power supply device, and a control device is constructed as a unit so as to be as independent as possible, and the control device manages and controls the whole operation of the underwater robot.

The structures of the independent units are configured such that single-function modules are contained in small-sized water-resistant-pressure-resistant cases and arranged in required positions and such that the water-resistant-pressure-resistant cases can communicate with one another through cables connected to connectors that are provided to the water-proof-pressure-resistant cases. The independent units are caused to be in functional corporation with one another to operate through communication among the single-function modules using the cables.

CITATION LIST

Patent Literature

Patent Literature 1: Japanese Patent Laid-Open No. 2010-478255
Patent Literature 2: Japanese Patent Laid-Open No. 2009-55408
Patent Literature 3: Japanese Patent Laid-Open No. 2009-260756
Patent Literature 4: Japanese Patent Laid-Open No. 2005-20422
Patent Literature 5: Japanese Patent Laid-Open No. 2005-328319
Patent Literature 6: Japanese Patent Laid-Open No. 11-355219
Patent Literature 7: Japanese Patent Laid-Open No. 2001-308766
Patent Literature 8: Japanese Patent Laid-Open No. 8-202445
Patent Literature 9: Japanese Patent Laid-Open No. 11-249734

SUMMARY OF INVENTION

Technical Problem

Underwater communication systems and methods that use an ultrasonic wave or an optical communication are surely suitable for underwater communication because they are less subjected to attenuation in water.

However, regular communication devices generally use an electrical signal to perform communication, and conversion from the electrical signal into an ultrasonic wave or an optical signal requires an additional process or device.

That is, various methods and protocols have been standardized to perform communication using an electrical signal, and it is therefore extremely convenience and advantageous if an electrical signal generated by an information-processing device can be exchanged as it is.

In contrast, methods using an ultrasonic wave or optical communication require conversion of an electrical signal generated by an information-processing device into a communication signal used in the ultrasonic wave or optical communication. The communication is therefore performed via a converter for this purpose, which inevitably makes a communication system complicated.

Alternatively, it is conceivable to use a wired telecommunication cable in order to perform communication using an electrical signal as it is, but the telecommunication cable requires the terminal thereof to be connected to a communication equipment to allow the electrical signal to be propagated. When an information-processing device uses wireless, the electrical signal needs to be converted into a radio wave by the communication equipment so as to be transmitted to the information-processing device.

In the case where a self-propelled relaying device is provided, the relaying device needs to be constantly moved to an appropriate position. This makes a system difficult to handle, and makes the system complicated and large-scale, which is problematic.

There is also proposed a method in which an underwater air channel is formed and wireless communication is performed through the air channel, but it is difficult to form the underwater air channel.

Thus, an object to be achieved by the present invention is to provide an underwater communication system that can perform communication underwater between information-processing devices using an electrical signal as it is, and that is easy to handle as compared with the case of a wired telecommunication cable, and that has a simple and low-cost structure.

In addition, another object to be achieved by the present invention is to provide transmission and reception between a hermetically-sealed structure in a ship or the like that operates in deep sea, without reducing the structural strength of the hermetically-sealed structure.

Note that the term "hermetically-sealed structure" here refers to an apparatus having a hermetically-sealed structure and operates below water surface, the apparatus including a deep submergence vehicle, a submarine, and an underwater operating robot.

Since the hermetically-sealed structure is exposed to a high pressure in deep sea, it is preferable for a shell body thereof to include holes as few as possible.

In the case where underwater communication is performed by using a wired telecommunication cable, the shell body of the hermetically-sealed structure inevitably needs to have a hole drilled in order to connect the telecommunication cable to a communication equipment.

That is, the shell body of the hermetically-sealed structure needs to have a hole drilled in both of the case where a communication equipment is attached to the shell body of the hermetically-sealed structure and a telecommunication cable is connected to the communication equipment, and the case where the telecommunication cable is caused to penetrate the shell body of the hermetically-sealed structure to be connected to the communication equipment in the hermetically-sealed structure.

However, a shell body of a hermetically-sealed structure that operates especially in deep sea preferably includes holes drilled as few as possible in order to resist water pressure. It is clear that the shell body preferably includes holes drilled as few as possible for a watertight structure not only in deep sea but also under no pressure.

There has been thus awaited the development of an underwater communication system in which no hole needs to be drilled in a shell body of a hermetically-sealed structure.

Hence, still another object to be achieved by the present invention is to provide an underwater communication system in which no hole needs to be drilled in a shell body of a hermetically-sealed structure whose purpose is to operate underwater.

Now, in the abovementioned conventional modularized underwater robot, the water-resistant-pressure-resistant cases are connected to one another using cables with connectors therebetween provided in the waterproof-pressure-resistant cases, but there are various problems with the connection using the cables.

First, the provision of the connector in the waterproof-pressure-resistant case means that a hole has to be drilled in the waterproof-pressure-resistant case. This is an essential drawback for the waterproof-pressure-resistant case, which is required to be pressure resistant and water resistant.

In the case where the connector is provided, since the waterproof-pressure-resistant case has a structural seam, measures has to be taken to prevent deterioration of pressure-resistant capability or water-resistant capability. This is also applied to the case where the cable is caused to penetrate without providing the connector. A pressure-resistant and water-resistant structure for a seam is complicated, which causes complicated work of processing.

Furthermore, in the conventional modularized underwater robot, a single-function module is difficult to replace because the independent units are connected to one another with the cables. The replacement of the single-function module is needed for the following reasons.

The underwater robot preferably performs various operations alone.

Note that the "operation" of the underwater robot referred in the present specification includes both of the operation to externally act on another object to change the state thereof, and the operation to only collect data without externally acting on another object.

Permanent installation of various tools that perform various operations in one underwater robot makes the underwater robot large or makes kinematic performance thereof deteriorated.

It is thus conceivable that, in the modularized underwater robot, the tools are replaced in accordance with the operation purposes to prevent capsizing or deteriorating kinematic performance with taking advantage of being modularized.

In the conventional modularized underwater robot, however, since the independent units are connected to one another by the cables, which makes replacement work complicated, it is difficult to quickly replace a unit such as a tool.

As to the power supply device, since the conventional power supply device is connected to the independent units by power cables, it is difficult to replace the power supply device.

The power supply device is relatively frequently replaced in accordance with an underwater operation time of the underwater robot, or to be recharged. The power supply device is thus preferably easy to replace. Needless to say, ease of replacement is taken into consideration in wiring of the power supply device, but it is difficult to replace, partly because of moisture being bad for the power supply device, and further improvements have been awaited.

It is alternatively conceivable that the modules wirelessly communicate with each other, with regard to the disadvantages of connection using the abovementioned cables.

A radio wave has, however, a property of being significantly attenuated in water. From an experiment conducted by the present inventors, it was found that modules cannot wirelessly communicate with each other at a distance of about 30 mm.

For this reason, there have been proposed many communication systems that use an ultrasonic wave or light instead of a radio wave underwater. However, since control is generally performed using an electrical signal, telecommunication is preferably performed without media conversion.

Still another object to be achieved by the present invention is thus to solve the problems that the above conventional underwater robots involve, providing wireless communication such that a totally independent unit without connection can be configured, and to provide an underwater robot that is excellent in pressure resistance and water resistance and that is easy to replace modules.

Solution to Problem

An underwater communication system according to the present invention includes:
- a hermetically-sealed structure that includes a shell body having a watertight structure and that is disposed underwater;
- a transmission unit that is arranged in the hermetically-sealed structure and that can perform wireless transmission;
- a non-conductive propagation medium that includes one end portion being brought into contact with an outside of the shell body; and
- a reception unit that receives an electrical signal wirelessly transmitted from the transmission unit and propagated through the shell body of the hermetically-sealed structure and the propagation medium, from the other end portion of the propagation medium that is located distally from the shell body.

In the underwater communication system, alternatively, the one end portion of the propagation medium may be fixed to the shell body, without making a hole in the shell body of the hermetically-sealed structure.

In the underwater communication system, alternatively, the propagation medium may include a suction cup integrally formed at the one end portion, and the propagation medium may be fixed to the shell body in such a manner that the suction cup is caused to adhere on an outside of the shell body.

In the underwater communication system, alternatively, the propagation medium may be in closely contact with the shell body of the hermetically-sealed structure, in the entire end surface of the one end portion.

In the underwater communication system, alternatively, the propagation medium may have flexibility, and may deform in conformity with an outside shape of the shell body so as to be in closely contact with the shell body.

In the underwater communication system, alternatively, at least a portion of the shell body of the hermetically-sealed structure that is in contact with the propagation medium may be made of non-conductive material.

In the underwater communication system, alternatively, the non-conductive material may be made of synthetic resin, rubber, glass, or ceramic.

In the underwater communication system, alternatively, the other end portion of the propagation medium from which the electrical signal is received may protrude from a water surface, and the electrical signal transmitted from the transmission unit may be received by reception unit that can wirelessly perform reception and that is provided in the vicinity of the other end portion of the propagation medium protruding from the water surface.

In the underwater communication system, alternatively, the reception unit may be contained inside a second hermetically-sealed structure that includes a shell body having a watertight structure and that is disposed underwater, and the other end portion of the propagation medium may be in contact with an outside of the shell body of the second hermetically-sealed structure.

In the underwater communication system, alternatively, the other end portion of the propagation medium may be fixed to the shell body without making a hole in the shell body of the second hermetically-sealed structure.

In the underwater communication system, alternatively, the propagation medium may include a suction cup integrally formed at the other end portion, and the propagation medium may be fixed to the shell body of the second hermetically-sealed structure in such a manner that the suction cup is caused to adhere on the outside of the shell body.

In the underwater communication system, alternatively, the propagation medium may be in closely contact with the shell body of the second hermetically-sealed structure in the entire end surface of the other end portion.

In the underwater communication system, alternatively, the propagation medium may have flexibility, and may deform in conformity with an outside shape of the shell body so as to be in closely contact with the shell body of the second hermetically-sealed structure.

In the underwater communication system, alternatively, at least a portion of the shell body of the second hermetically-sealed structure that is in contact with the propagation medium may be made of non-conductive material.

In the underwater communication system, alternatively, the propagation medium may be made of synthetic resin, rubber, glass, or ceramic.

An underwater robot of the present invention includes:
- a plurality of independent units each containing a single-function module in a waterproof-pressure-resistant case, the single-function modules including at least an operation device and a control device;
- a chassis to which the independent units can be detachably attached; and
- a non-conductive propagation medium for connecting a plurality of the independent units by being brought into contact and fixed to the outsides of the waterproof-pressure-resistant cases without making a hole in the waterproof-pressure-resistant cases of the independent units,
- each of the independent units includes, in addition to the single-function module, communication unit that can perform transmission and reception, and a battery for supplying power to the single-function module and the communication unit, and
- the control device controls the other single-function modules so as to control the whole operation of the underwater robot by communicating with communication unit of the independent units containing the other single-function modules via the communication unit of the independent unit containing the control device.

Alternatively, the underwater robot may include an independent unit containing a power supply device, and wherein
- each of the other independent units including the single-function module may incorporate, in addition to the single-function module, communication unit that can perform transmission and reception, a power transferring receiver, and a rechargeable battery that is rechargeable, and
- the power supply device may generate a time-varying magnetic field, and the power transferring receivers of the other independent units may each convert the time-varying magnetic field into power so as to supply the power to the single-function module thereof, directly or via the rechargeable battery thereof.

In the underwater robot, alternatively, the power supply device may be configured to include a plurality of units that can be increased depending on an operation time or a load of the underwater robot.

In the underwater robot, alternatively,
the chassis itself may be made of non-conductive material, and may also serve the function of the propagation medium to propagate an electrical signal between the independent units.

In the underwater robot, alternatively,
the chassis may be made of synthetic resin, rubber, glass, or ceramic.

In the underwater robot, alternatively,
the independent units containing the control device may be configured so as to be replaced with the other independent unit that has a control program for a different operation purpose, and to be replaced with the other single-function module depending on the operation purpose.

In the underwater robot, alternatively,
the propagation medium or the chassis may include relaying unit: for receiving, amplifying, and transmitting an electrical signal.

In the underwater robot, alternatively,
the propagation medium may be made of synthetic resin, rubber, glass, or ceramic.

Advantageous Effects of Invention

According to an underwater communication system of the present invention, a transmission unit is arranged inside a hermetically-sealed structure, an electrical signal is propagated through a shell body of the hermetically-sealed structure and a propagation medium by being wirelessly transmitted from the transmission unit, and received by reception unit at the other end portion of the propagation medium.

In such a manner, according to the present invention, the electrical signal can be transmitted as it is, and conversion of the electrical signal into an ultrasonic wave or an optical signal is not needed as compared with a method using an ultrasonic wave or optical communication, which dispenses with a converter or the like, providing a system having a simple structure.

In addition, existing telecommunications protocols can be used, which provides an underwater communication system that is convenient to use.

A further advantage of the underwater communication system of the present invention is in that the transmission unit can wirelessly transmit the electrical signal, and therefore commonly and widely used wireless communication network systems can be used.

That is, a lot of recent information-processing devices such as computers incorporate wireless LAN communication unit, and when such an information-processing device is used, communication can be performed by arranging the information-processing device in the hermetically-sealed structure without connecting a cable thereto and wirelessly transmitting a result of information processing by using the wireless LAN communication unit.

When an information-processing device incorporating the wireless LAN communication unit is also used for the reception unit, the electrical signal can be received like a regular wireless LAN by arranging the information-processing device in the vicinity of the other end portion of the propagation medium. That is, the communication can be transparently performed between the computers incorporating the wireless LANs.

Still another advantage of the underwater communication system of the present invention is in that an electrical signal wirelessly transmitted from the transmission unit in the hermetically-sealed structure can be propagated to the outside by causing one end portion of the propagation medium to be in contact with an outside of the she body, without making a hole in the shell body of the hermetically-sealed structure.

As compared with a typical telecommunication cable, the telecommunication cable needs to be connected to a communication equipment attached to the shell body with a terminal thereof, or needs to penetrate the shell body to be connected to communication unit in the hermetically-sealed structure.

In any of the above cases, with the wired telecommunication cable, the shell body is to have a structural seam in a portion thereof, which is not preferable both for maintaining a watertight state and for maintaining a pressure-resistance strength.

In contrast, according to the present invention, no hole needs to be drilled in the shell body of the hermetically-sealed structure. This is extremely advantageous to secure a watertight state of the hermetically-sealed structure that is disposed underwater.

In particular, the shell body that has no structural seam and is excellent in pressure resistance can be easily formed for the hermetically-sealed structure to be disposed in deep sea.

Note that the present invention can also be applied to a shell body having a seam. The shell body may be made of conductive body such as metal, and may have a hole drilled in a portion thereof, the hole to which a non-conductive member is fit. For example, the shell body may be formed by a metal container having a window provided to a portion thereof. Even with such a shell body, according to the present invention, underwater communication can be performed by bringing a non-conductive propagation medium into contact with the window.

Still another advantage of the underwater communication system of the present invention is in that communication can be performed by using a propagation medium having elasticity and flexibility.

In addition, according to the present invention, a propagation medium that has a simple structure, rather than a structure of a covering material, a core material or the like such as a telecommunication cable, can be used.

Furthermore, the propagation medium can be configured by using a material that has a certain water-resistant property, elasticity, and flexibility, which allows for obtaining a propagation medium that is extremely suitable for underwater use.

In addition, in the underwater robot of the present invention, single-function modules are contained in waterproof-pressure-resistant cases to form a plurality of independent units. The independent units are detachably attached to a common chassis. Each independent unit is connected to the other independent unit by a non-conductive propagation medium that is brought into contact with and fixed to an outside of the waterproof-pressure-resistant case, without making a hole in a wall of the waterproof-pressure-resistant case.

Furthermore, the independent unit includes communication unit that can perform transmission and reception and a battery, and the control device wirelessly communicates with the other single-function module by the communication unit, to perform control such that the single-function modules can operate as the underwater robot on the whole.

In such a manner, according to the underwater robot of the present invention, the single-function modules can wirelessly communicate with the other single-function modules by the propagation media. As a result, communication between the single-function modules can be provided wirelessly without a making hole for a telecommunication cable in the waterproof-pressure-resistant case containing the single-function module.

The waterproof-pressure-resistant case does not need to have a structural seam for a telecommunication cable. As a result, according to the present invention, the independent units can maintain pressure-resistant capability or water-resistant capability at a high level. Preferable functions/traits can be obtained for an underwater robot that is designed to hold a non-water-resistant apparatus and to operate below water surface.

Furthermore, according to the present invention, replaceability of the independent units is significantly improved by performing communication wirelessly.

According to the underwater robot of the present invention, since the independent units are not connected to one another with the telecommunication cables, there is no disconnection and reconnection of the cable when the independent units are replaced, which makes the replacement of the independent units extremely easy.

In this case, it is needless to say that, when the independent units each incorporate a battery for power, the independent units are easy to change. Even when the independent units each incorporate a rechargeable battery, according to one aspect of the present invention, power can be wirelessly supplied from a power supply device to the independent units.

The underwater robot of this aspect includes an independent unit containing a power supply device, and the independent units each incorporate a power transferring receiver and a rechargeable battery, in addition to the single-function module and the communication unit thereof.

In the above configuration, the power supply device generates a time-varying magnetic field, the power transferring receivers of the other independent units each convert the time-varying magnetic field into power to charge the battery, or supply the power directly to the single-function module.

In conventional practice, since the power supply device is connected to the independent units using power cables, it is difficult to replace the power supply device or the independent units.

According to an aspect of the present invention in which the power is wirelessly supplied, it is possible not only to easily replace the independent units due to not being connected by power cables, but also to extremely easily replace the independent unit that contains the power supply device.

According to this aspect, the independent unit of the power supply device can be easily replaced to meet an underwater operation time or an operation load of the underwater robot.

In addition, by preparing a plurality of units of power supply devices that can supply power for a certain period of time, the power supply devices can be increased according to the operation time or the load of the underwater robot.

An underwater robot in which a power supply device is extremely easy to handle can be obtained by containing the power supply device ire a completely sealed waterproof-pressure-resistant case, since moisture is bad for the power supply device.

Furthermore, according to the present invention, in the modularized underwater robot, the independent units can be easily replaced, which allows a control device that has a different control program to be replaced with depending on an operation purpose, and allows the other single-function module to be replaced with depending on the operation purpose. This allows one underwater robot to be used as an underwater robot having a totally different operation purpose.

In addition, according to the present invention, the chassis can serve as a propagation medium by forming the chassis using a non-conductive material.

In this case, an electrical signal can be exchanged between the single-function modules through the chassis with an electrical signal not being subjected to the significant attenuation in water, which allows for obtaining an underwater robot having an extremely simple structure.

By providing relaying unit that receives, amplifies, and transmits an electrical signal in the chassis or the propagation medium in places, communication functions of the single-function modules are made more reliable.

BRIEF DESCRIPTION OF DRAWINGS

FIG. 3A is a diagram illustrating experimental results that show improvements of received radio wave intensities underwater by the underwater communication system of the present invention.

DESCRIPTION OF EMBODIMENTS

Embodiments of the present invention will be described below with reference to the drawings.

Figure 1:
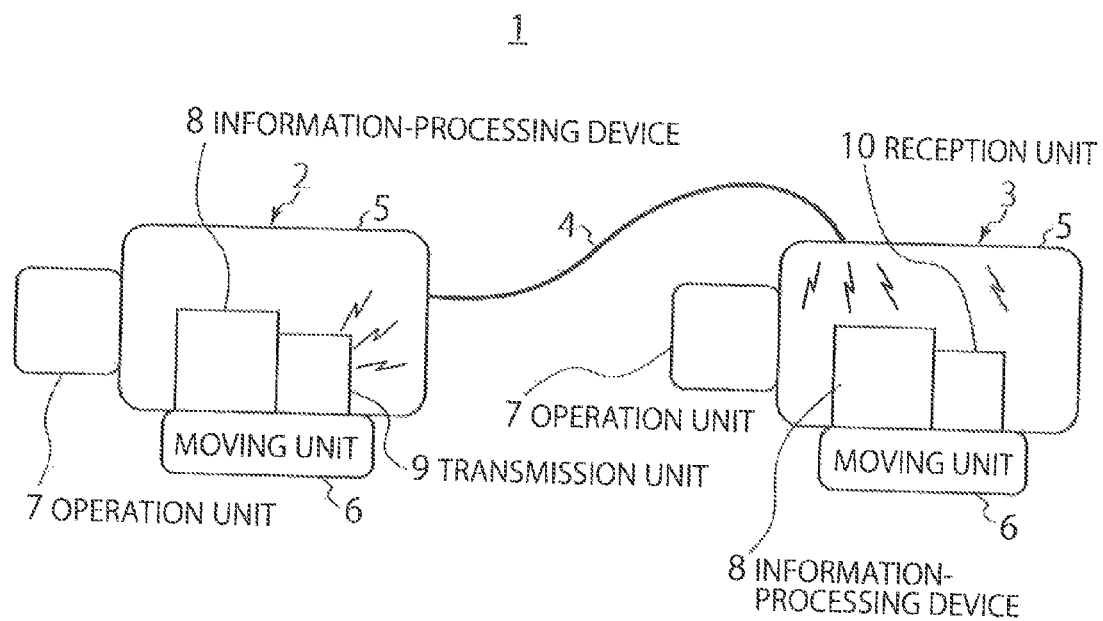
FIG. 1 is a configuration diagram of an underwater communication system according to one embodiment of the present invention.

FIG. 1 shows an underwater communication system according to one embodiment of the present invention.

An underwater communication system 1 of the present embodiment includes two hermetically-sealed structures 2 and 3, wherein a propagation medium 4 connects between the hermetically-sealed structure 2 and the hermetically-sealed structure 3.

The propagation medium 4 is non-conductive, and one end portion of which is in contact with an outside of a shell body 5.

The hermetically-sealed structure 2 includes the watertight structure shell body 5, and includes moving unit 6 and operation unit 7, which are not indispensable components.

The hermetically-sealed structure 2 is a device designed to operate underwater, and disposed underwater in use. The hermetically-sealed structure 2 is applicable to, for example, a submersible, a deep submergence vehicle, an underwater operating robot or the like, but is not limited thereto. Alternatively, the hermetically-sealed structures 2 and 3 may be modules that are disposed in close proximity to each other.

The moving unit 6 or the operation unit 7 can differently function depending on intended purposes of the hermetically-sealed structure 2, or can be omitted as the case may be. For example, the moving unit 6 or the operation unit 7 can be omitted in a hermetically-sealed structure that is to be fixed for collecting data.

Inside the shell body 5, an information-processing device 8 and a transmission unit 9 are contained.

The information-processing device 8 is an information-processing device including a normal computer. The information-processing device 8 processes data collected by the operation unit 7, controls the whole of the hermetically-sealed structure 2, and controls external communication.

The transmission unit 9 is means for receiving data and wirelessly transmitting the data, and is preferably means for transmitting the data under the control of the information-processing device 8.

The other hermetically-sealed structure 3 has a configuration similar to that of the hermetically-sealed structure 2.

Parts of the hermetically-sealed structure 3 identical to those of the hermetically-sealed structure 2 are denoted by the same reference numerals, and explanations thereof will be omitted.

The hermetically-sealed structure 3 and the hermetically-sealed structure 2 differ from each other only in that the hermetically-sealed structure 2 includes the transmission unit 9, whereas the hermetically-sealed structure 3 includes reception unit 10.

At least one of the transmission unit 9 and the reception unit 10 can serve as communication unit of the information-processing device 8. Needless to say, the transmission unit 9 and the reception unit 10 can serve as transmitting/reception unit in a unified manner. For example, the transmission unit 9 and the reception unit 10 can serve as wireless LAN communication unit of the computer. In this case, the information-processing device, the transmission unit, and the reception unit can be configured into one device.

Although FIG. 1 illustrates only the case where the transmission unit 9 of the hermetically-sealed structure 2 performs transmitting to the reception unit 10 of the hermetically-sealed structure 3, this does not mean that the transmitting can be performed only one direction from the hermetically-sealed structure 2 to the hermetically-sealed structure 3, and this is merely to illustrate the flow of the transmitting with respect to the case, as an example, where the transmitting is performed from the hermetically-sealed structure 2 to the hermetically-sealed structure 3. Needless to say, in the case where the transmission unit 9 and the reception unit 10 serve as communication unit that can perform transmission and reception, it is naturally clear that the transmitting can be performed from the hermetically-sealed structure 3 to the hermetically-sealed structure 2.

The propagation medium 4 is made of non-conductive material such as synthetic resin, rubber, glass, and ceramic.

As the synthetic resin, for example, polyvinyl chloride, polyethylene, polypropylene, acrylic, polyacetal, polycarbonate, Bakelite (R), or polyester can be used.

In addition, as the rubber, natural rubber or synthetic rubber (e.g., styrene butadiene rubber, acrylonitrile butadiene rubber, polychloroprene rubber, ethylene propylene rubber, or methyl vinyl silicone rubber) can be used.

In addition, as the glass, for example, glass epoxy can be used.

Furthermore, the above materials can be used in combination as appropriate. The term "combination of the materials" means that, since any non-conductive material can be used for the propagation medium for underwater communication, a plurality of materials form the propagation medium in a splicing manner, or a plurality of materials are used in combination while an appropriate material is used in conformity with a shape of a portion of the propagation medium, or a plurality of materials are used side-by-side in combination.

Figure 2A:
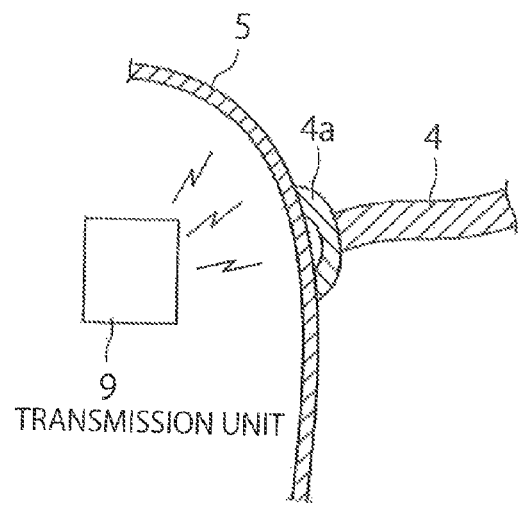
FIG. 2A is a cross sectional view showing how to connect one end portion of a propagation medium of the present invention to a she body.

The connection of the propagation medium 4 is made by bringing one end portion thereof into contact to and fixing it to the outside of the shell body 5, without making a hole in the shell body 5. FIG. 2A shows one example of fixing the propagation medium 4.

In the example of FIG. 2A, a suction cup 4a is integrally formed at the one end portion of the propagation medium 4, and the propagation medium 4 is fixed to the shell body 5 such that the suction cup 4a is caused to adhere on the outside of the shell body 5.

According to such a method of fixing, the shell body 5 does not need to have any hole to be drilled. That is, at a connecting portion of the propagation medium 4, the shell body 5 can be made not to have any structural seam. The method of fixing the propagation medium 4 is not limited to the above method. For example, the propagation medium 4 may be fixed to the shell body 5 using an adhesive or the like.

Note that the transmission unit 9 may not be in contact with the shell body 5 as shown in FIG. 2A.

The other end portion of the propagation medium 4 is brought into contact with and fixed to the outside of the shell body 5 of the hermetically-sealed structure 3 without making a hole, as with the case of the one end portion.

Note that the propagation medium 4 may be in contact with the outsides of the shell bodies at the one end portion and the other end portion, and does not necessarily need to be fixed to the shell body 5. For example, like in a configuration example of FIG. 2B(c) to be hereafter described, the propagation medium 4 may be only mounted on upper surfaces of the substantially rectangular parallelepiped shell bodies 5.

Figure 2B:
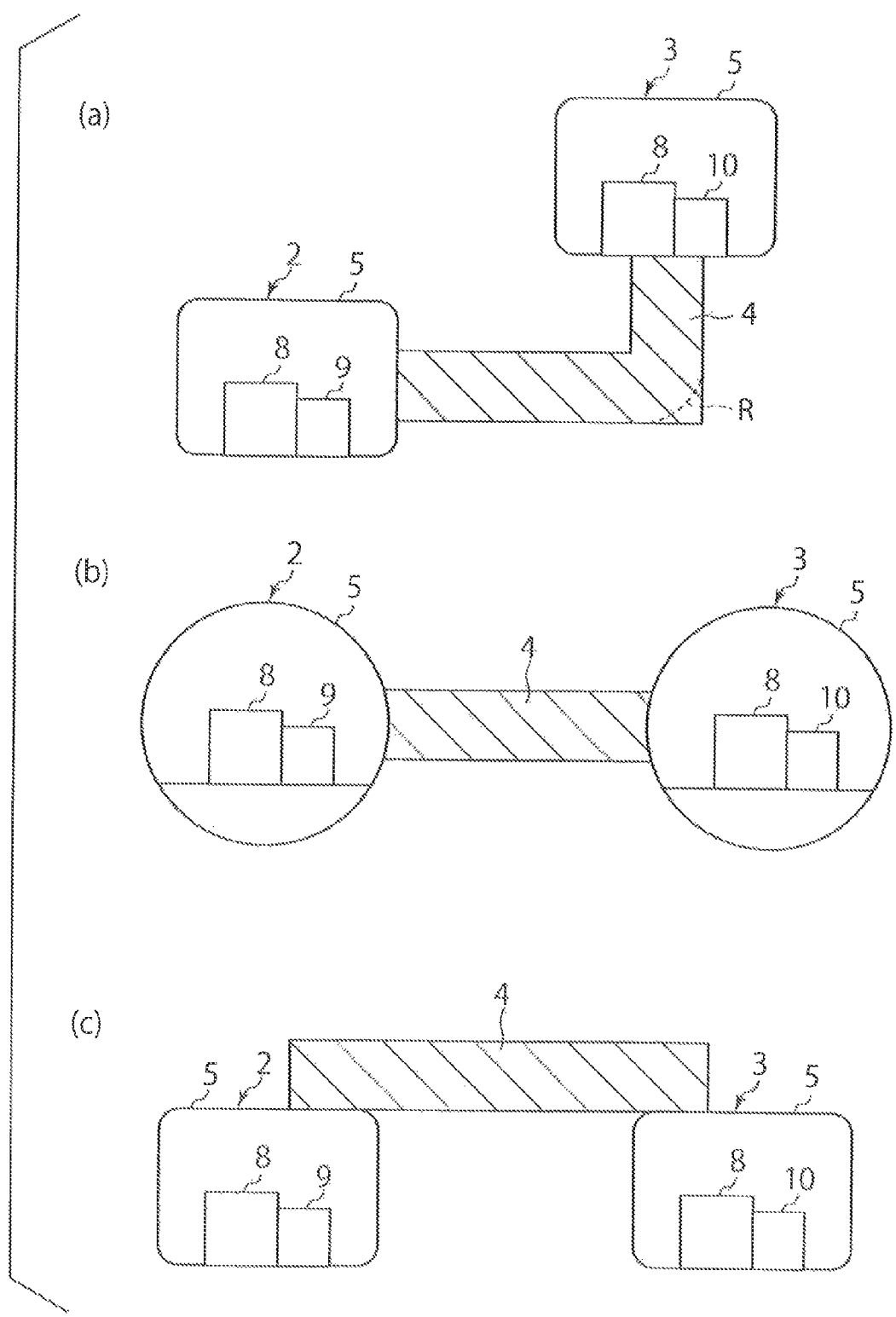
FIG. 2B is a diagram showing configuration examples of the underwater communication system according to the present invention.

Some of configurations of the underwater communication system according to the present invention will be here described. FIG. 2B shows the configuration examples of the underwater communication system according to the present invention. In FIG. 2B, the moving unit 6 and the operation unit 7 are omitted.

In a configuration example shown in FIG. 2B(a), the hermetically-sealed structures 2 and 3 each include the substantially rectangular parallelepiped shell body 5, and the propagation medium 4 is configured to have an L shape. In such a case where a bent portion is provided to the propagation medium 4, a received radio wave intensity is reduced. However, the received radio wave intensity can be improved by rounding off a corner of the propagation medium 4 to form a curved surface as shown in a dotted line R of FIG. 2B(a).

In a configuration example shown in FIG. 2B(b), the hermetically-sealed structures 2 and 3 each include the spherical shell body 5, and the propagation medium 4 connects the two spherical shell bodies 5. The shell bodies 5 are, for example, spherical shells made of glass.

In a configuration example shown in FIG. 2B(c), the hermetically-sealed structures 2 and 3 each include the substantially rectangular parallelepiped shell body 5, and the propagation medium 4 is mounted on the upper surfaces of the shell bodies 5.

To enhance the received radio wave intensity, as shown in FIGS. 2B(a) to (c), the propagation medium 4 is preferably in closely contact with the shell bodies 5 in the entire end surfaces of the end portions.

In addition, if the shell body 5 has a shape including a curved surface like the configuration example shown in FIG. 2B(b), the propagation medium 4 to be applied to is preferably made of material having flexibility. This allows the flexible propagation medium 4 to deform in conformity with the shape of the outside of the shell body 5, and the propagation medium 4 is brought into closely contact with the shell bodies 5 in the entire end surfaces thereof. As a result, the intensity of radio waves received by the reception unit 10 can be enhanced.

At least a portion of the shell body 5 that is brought into contact with the propagation medium 4 is preferably made of non-conductive material (e.g., synthetic resin, rubber, glass, or ceramic). As the synthetic resin, for example, polyvinyl chloride, polyethylene, polypropylene, acrylic, polyacetal, polycarbonate, Bakelite (R), or polyester can be used. As the rubber, natural rubber or synthetic rubber (e.g., styrene butadiene rubber, acrylonitrile butadiene rubber, polychloroprene rubber, ethylene propylene rubber, or methyl vinyl silicone rubber) can be used. In such a manner, by configuring a contact portion by such a non-conductive material, the intensity of the radio waves received by the reception unit 10 can be enhanced.

According to the underwater communication system 1, communication can be performed with attenuation that is significantly smaller than that in water.

The underwater communication system 1 is disposed underwater as a whole in use, an electrical signal is wirelessly transmitted from the transmission unit 9 inside the hermetically-sealed structure 2, the electrical signal is propagated through the shell body 5 of the hermetically-sealed structure 2 and the propagation medium 4, propagated to the shell body 5 of the hermetically-sealed structure 3, and wirelessly transmitted to the inside of the hermetically-sealed structure 3. Inside the hermetically-sealed structure 3, the telecommunications can be intercepted by the reception unit 10.

Here, the attenuation of the radio wave intensity according to the present invention will be compared to the attenuation of the radio wave intensity in water.

Figure 3B:
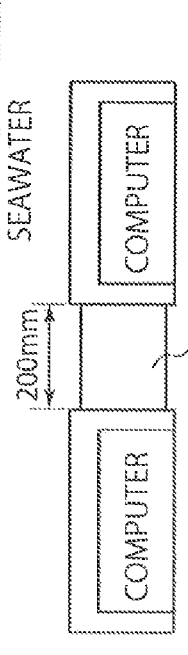
FIG. 3B is a diagram illustrating experimental results that show improvements of received radio wave intensities underwater by the underwater communication system of the present invention.
Figure 3C:
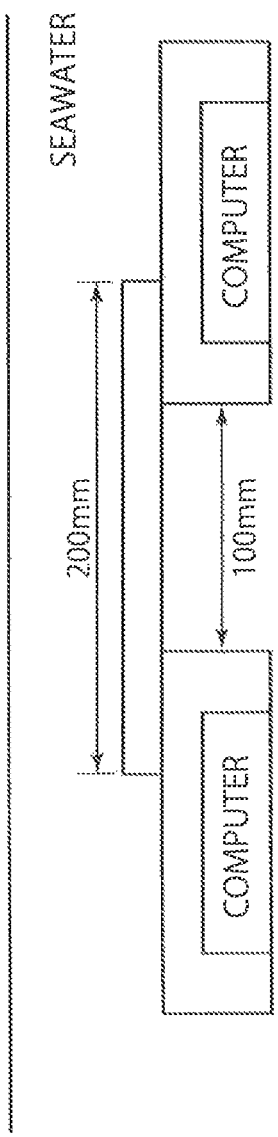
FIG. 3C is a diagram illustrating experimental results that show improvements of received radio wave intensities underwater by the underwater communication system of the present invention.

FIG. 3A to FIG. 3C each show how much the wireless radio wave intensity emitted in seawater is attenuated through the propagation medium, for each of a variety of materials. In each of FIG. 3A to FIG. 3C, a schematic configuration of an underwater communication system that was used in each measurement is illustrated above a table that shows experimental results.

A small-sized personal computer was used as a transmission source, and a resin (polypropylene) made water-resistant case was used as a shell body of a watertight structure. The dimensions of the water-resistant case were 200 (mm)*150 (mm)*55 (mm). A radio wave of a certain intensity was emitted by using wireless LAN communication unit accompanying the computer, and the computer was contained in the water-resistant case.

First, when the radio wave was received at a distance of 500 (mm) in air without a propagation medium provided, the received radio wave intensity was −30 (dB). Next, when the case was immersed to a depth of 30 (mm) in seawater without a propagation medium provided, the radio wave was not able to be received.

Next, propagation media of various materials were used, and as shown in FIG. 3A, a water-resistant case (hermetically-sealed structure) containing a computer therein was sunk below water surface to a depth of 100 (mm) (80 (mm) when a brick was used), communication unit of the computer was caused to transmit a radio wave, and received radio wave intensities were measured on the water surface. The table of FIG. 3A shows the received radio wave intensities that were measured for materials of the propagation medium. Here, the propagation media to be used other than the brick each have a plate-like shape with dimensions of 200 (mm)*200 (mm)*20 (mm). The contact area between each propagation medium and the hermetically-sealed structure was 200*20 (mm$^2$), and the contact area was 50*80 (mm$^2$) in the case of the brick.

As shown in FIG. 3A, according to the experiment, with either of the propagation media made of natural rubber or synthetic rubber (styrene butadiene rubber, acrylonitrile butadiene rubber, polychloroprene rubber, ethylene propylene rubber, methyl vinyl silicone rubber), when the container and the computer were sunk below water surface at the depth of 100 (mm), the received radio wave intensities of about −60 (dB) were able to be measured. With a polyvinyl chloride, a polyethylene, and a polypropylene, the received radio wave intensities of about −77 (dB) were able to be measured.

Furthermore, also with the propagation medium of a ceramic (brick), a received radio wave intensity of about −70 (dB) was able to be measured.

Next, as shown in FIG. 3B, two hermetically-sealed structures connected by a propagation medium of 200 (mm) in length were sunk in sea water. Then, a radio wave was transmitted to one of the hermetically-sealed structures, and the other hermetically-sealed structure was caused to receive the radio wave that was propagated through the propagation medium. The table of FIG. 33 shows the received radio wave intensities that were measured for materials of the propagation medium. Here, the propagation media to be used each have, as with the case of FIG. 3A, a plate-like shape with dimensions of 200 (mm)*200 (mm)*20 (mm). The contact area between each propagation medium and the hermetically-sealed structures was 200*20 (mm$^2$).

As shown in FIG. 3B, with either of the propagation media made of natural rubber or synthetic rubber (styrene butadiene rubber, acrylonitrile butadiene rubber, polychloroprene rubber, ethylene propylene rubber, methyl vinyl silicone rubber), the received radio wave intensities of −72 (dB) or more were able to be measured. In addition, with a polyvinyl chloride, a polyethylene, and a polypropylene, the received radio wave intensities of about −77 (dB) were able to be measured.

Next, as shown in FIG. 3C, a propagation medium is mounted on two hermetically-sealed structures arranged at a distance of 100 mm. Then, a radio wave was transmitted to one of the hermetically-sealed structures, and the other hermetically-sealed structure was caused to receive the radio wave that was propagated through the propagation medium. The table of FIG. 3C shows the received radio wave intensities that were measured for materials of the propagation medium. Here, the propagation medium to be used each have a plate-like shape with dimensions of 200 (mm)*200 (mm)*8 (mm). The contact area between each propagation medium and the hermetically-sealed structures was 200*50 (mm$^2$).

As shown in FIG. 3C, with any of the propagation media made of acrylic, polyacetal, polycarbonate, Bakelite (R), and polyester, the received radio wave intensities of −85 (dB) or more were able to be measured. In addition, with the propagation medium made of glass (glass epoxy), the received radio wave intensity of about −82.5 dB was able to be measured.

It was confirmed in another experiment that, reception success rates were more than 85% with the received radio wave intensities of up to about −88 (dB), which stands up enough to practical use. For this reason, it is understood that the attenuations are significantly reduced by using non-conductive propagation media as described above, which allows for underwater communication.

In particular, a radio wave is attenuated to such an extent that it is impossible to measure the radio wave at a distance of about 30 (mm) in sea water, whereas with the configurations of the present invention, radio waves were able to be received with radio wave intensities still with some margin, even at a distance of 200 (mm).

Figure 4:
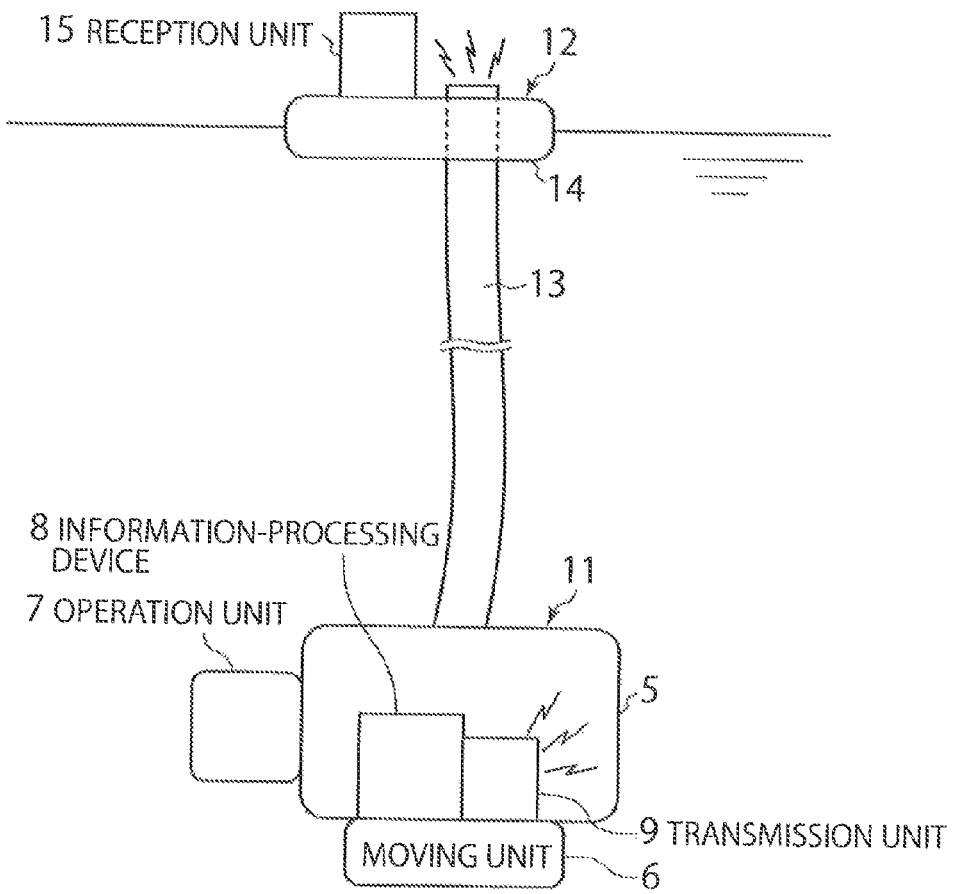
FIG. 4 is a configuration diagram of an underwater communication system according to another embodiment of the present invention.

FIG. 4 shows another embodiment of the present invention.

The embodiment of FIG. 4 illustrates an underwater communication system for transmitting information on a hermetically-sealed structure 11 for operating underwater to reception unit on a water surface, rather than for performing communications between the hermetically-sealed structures.

Note that, as with the case of FIG. 1, although FIG. 4 illustrates only the case where the transmitting is performed from underwater to the water surface, the transmitting can be performed from the water surface to underwater by providing the transmitting/reception unit.

This underwater communication system includes the hermetically-sealed structure 11 underwater, a receiving base 12 on the water surface, and a propagation medium 13 for connecting therebetween.

As with the embodiment shown in FIG. 1, the hermetically-sealed structure 11 includes the shell body 5, and includes the moving unit 6 and the operation unit 7, which are not indispensable components.

The information-processing device 8 and the transmission unit 9 are contained in the shell body 5.

The receiving base 12 includes a floating body 14 and reception unit 15.

One end portion of the propagation medium 13 is in contact with the outside of the shell body 5 without making a hole in the shell body 5 of the hermetically-sealed structure 11. Note that the one end portion of the propagation medium 13 is preferably fixed to the outside of the shell body 5, and the method of fixing shown in FIG. 2A can be used therefor, for example.

The other end portion of the propagation medium 13 is supported by the floating body 14 so as to protrude from the water surface. The reception unit 15 is provided on the floating body 14 in the vicinity of the other end portion of the propagation medium 13.

According to this embodiment, information collected by the hermetically-sealed structure 11 that is disposed underwater can be wirelessly transmitted by the transmission unit 9, and the electrical signal thereof can be propagated through the propagation medium 13, transmitted from the other end portion of the floating body 14 on the water surface, and received by the reception unit 15.

Figure 5:
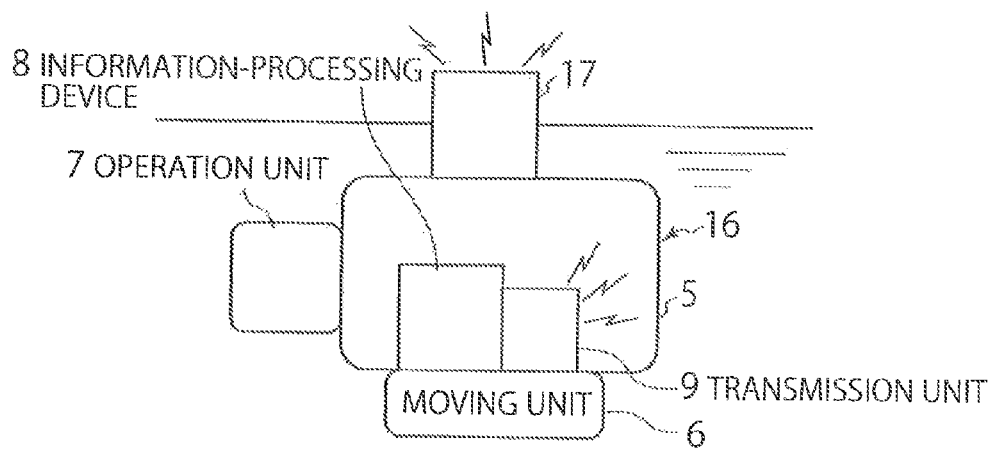
FIG. 5 is a configuration diagram of an underwater communication system according to still another embodiment of the present invention.

FIG. 5 shows an underwater communication system according to another embodiment of the present invention without using the floating body 14.

The embodiment in FIG. 5 includes a hermetically-sealed structure 16 and a propagation medium 17 erected on the hermetically-sealed structure 16. Since a structure of the hermetically-sealed structure 16 is similar to those of the hermetically-sealed structures 2 and 11, redundant explanations thereof will be omitted.

In this embodiment, the floating body 14 is not used, the hermetically-sealed structure 16 goes below water surface at shallow depths, and the propagation medium 17 is caused to protrude from the water surface.

Also in the present embodiment, information collected by the hermetically-sealed structure 16 is wirelessly transmitted from the transmission unit 9, and the electrical signal thereof is propagated through the propagation medium 17 and wirelessly transmitted into the air from an end portion of the propagation medium 17 protruding from the water surface.

Figure 6:
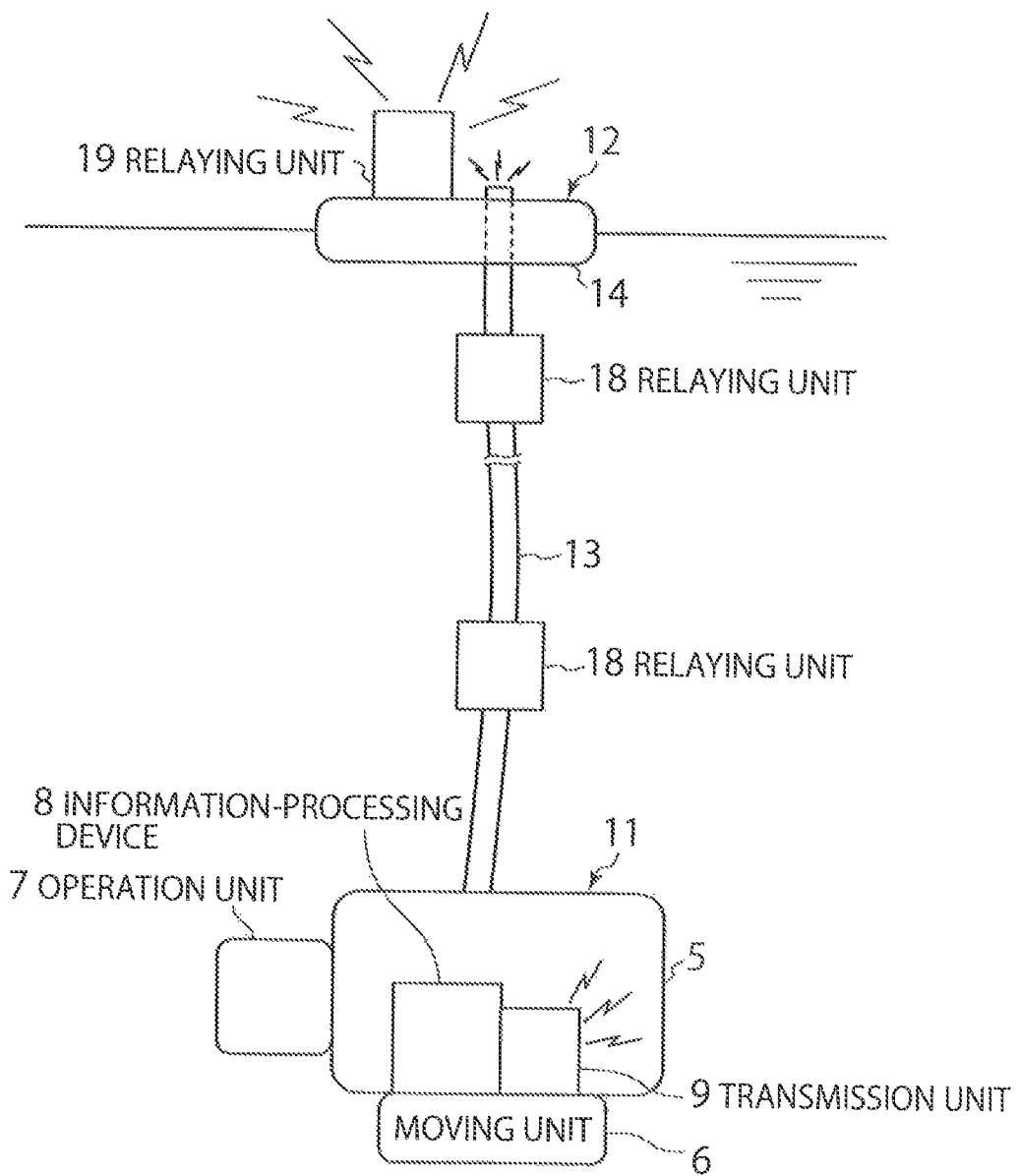
FIG. 6 is a configuration diagram of an underwater communication system according to still another embodiment of the present invention.

FIG. 6 shows still another embodiment of the present Invention.

The embodiment of FIG. 6 has a configuration similar to that of the embodiment shown in FIG. 4, and components identical to those of FIG. 4 are thus denoted by the same reference numerals, and redundant explanations thereof will be omitted.

Note that the embodiment of FIG. 6 is different from the underwater communication system of FIG. 4 in that the propagation medium 13 includes relaying unit 18, provided at predetermined intervals, for receiving and amplifying an electrical signal.

In addition, they are different in that the embodiment of FIG. 6 includes relaying unit 19 instead of the reception unit 15 on the receiving base 12.

According to the present embodiment, since the relaying unit 18 are provided at portions located at certain intervals in the propagation medium 13, an electrical signal can be propagated through the long propagation medium 13.

Furthermore, by using the relaying unit 19 on the receiving base 12 that is relatively high-output, information can be transmitted to a receiving base at a long range.

Next, an underwater robot to which the above underwater communication system is applied will be described. This underwater robot is configured such that single-function modules such as an operation device, a power supply device, and a control device are attached to a common chassis, as independent units, non-water-resistant parts of the independent units are contained in a waterproof-pressure-resistant case, the independent units wirelessly communicate with one another, and operations of the independent units are controlled by the control device.

The underwater robot according to an embodiment of the present invention will be described below with reference to the drawings.

Figure 7:
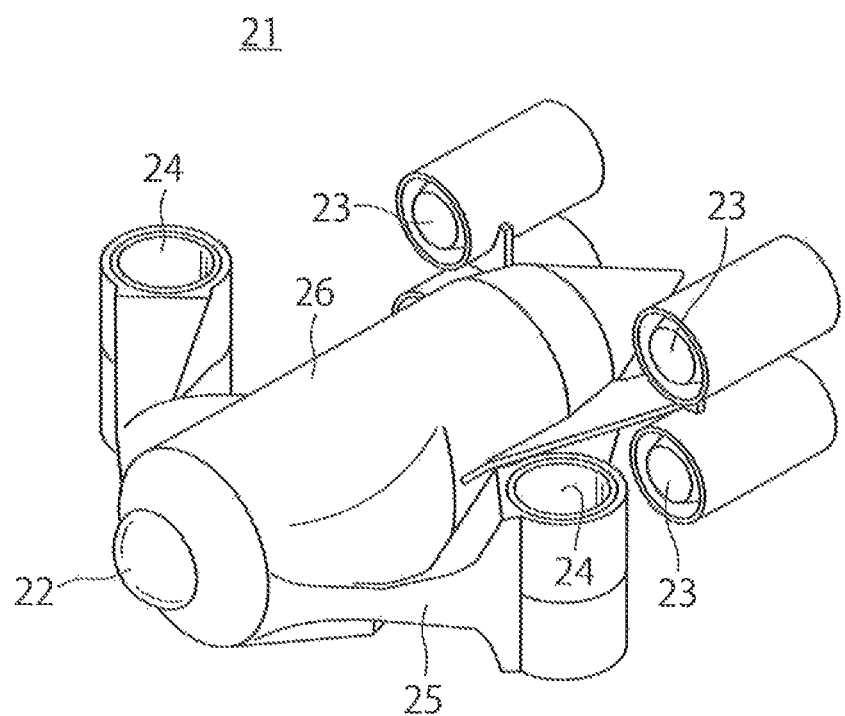
FIG. 7 is a perspective view of an underwater robot according to one embodiment of the present invention.

FIG. 7 shows an underwater robot according to one embodiment of the present invention.

An underwater robot 21 of the present embodiment includes an independent unit 22 of an operation device, independent units 23 of horizontal propulsion devices, independent units 24 of vertical propulsion devices, and a chassis to which these independent units can be detachably attached. In the present embodiment, the chassis is configured to be able to be divided into a lower chassis 25 and an upper chassis 26.

The "operation" of the operation device includes, as described above, both of the operation to externally act on another object to change the state thereof, and the operation to only collect data without externally acting on another object. For this reason, the independent unit 22 of the operation device can incorporate a camera for the purpose of obtaining visual images, can incorporate various sensors for the purpose of collecting particular data, and can incorporate a manipulator for the purpose of picking objects, for example.

There are four units as the independent units 23 of the horizontal propulsion devices, which give propulsion in a horizontal direction, and which are separately provided right and left, and also up and down, so as to give the propulsion at an angle.

The independent units 23 of the horizontal propulsion devices are each formed in a columnar-shape, and each formed so as to be fit into a cylindrical-shaped portion in the rear of the lower chassis 25.

The independent units 24 of the vertical propulsion devices each include a screw provided in a cylindrical casing, and are each formed so as to be fit into the inside of a cylindrical-shaped portion of the upper chassis 26.

The propulsion device is subsumed under moving unit that is broader concept thereof, and the moving unit may be a wheel or a Caterpillar (R) instead of a screw as needed, and can be omitted like a stationary underwater robot or the like.

Figure 8:
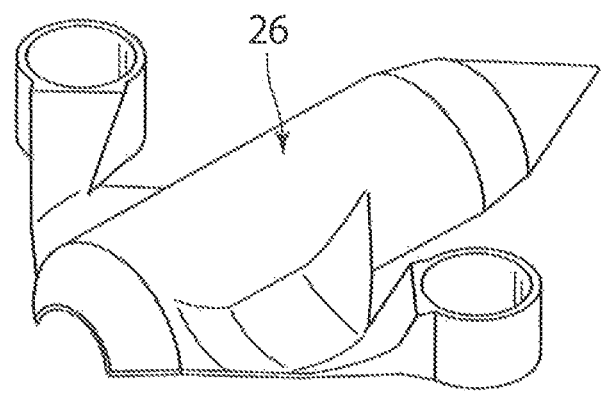
FIG. 8 is an exploded perspective view of the underwater robot of FIG. 7.
Figure 8:
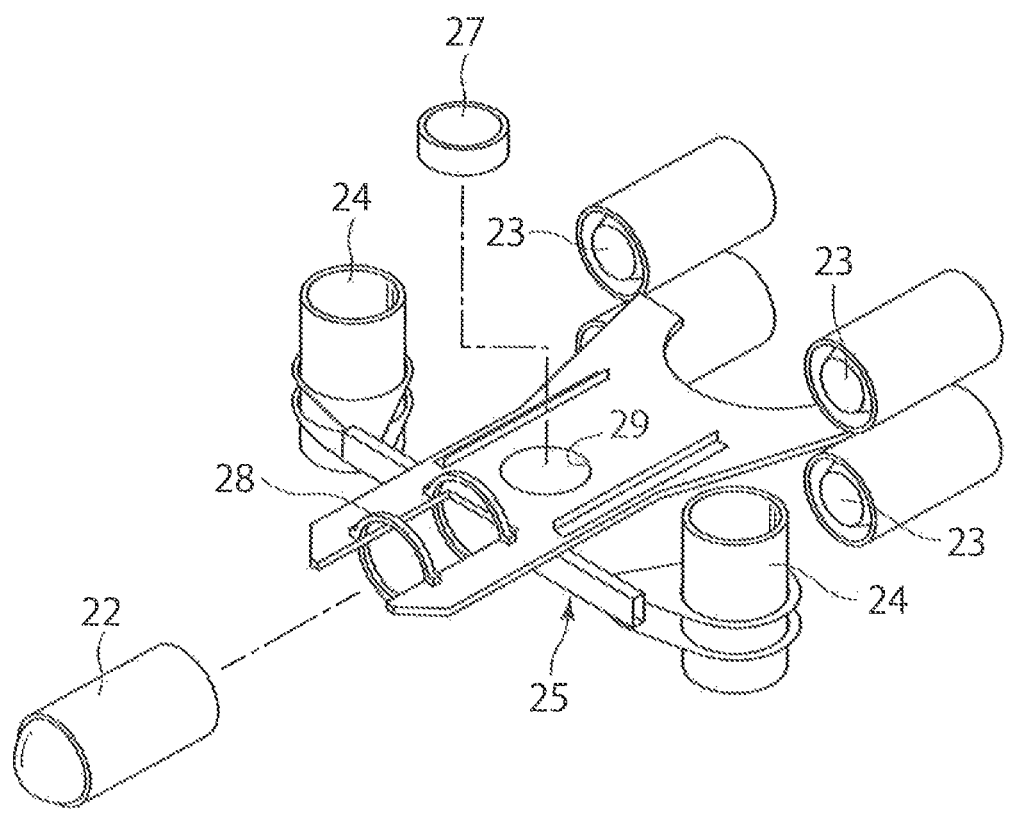

FIG. 8 shows the underwater robot 21 of FIG. 7 in an exploded manner. In FIG. 8, the upper chassis 26 is shown in such a manner as to be disassembled and positioned above.

As shown in FIG. 8, although the upper chassis 26 includes the independent units 24 of the vertical propulsion devices connected thereto at some portions, the lower chassis 25 includes all of the independent units connected thereto.

As shown in FIG. 8, the underwater robot 21 includes therein an independent unit 27 of a control device.

The independent unit 22 of the operation device is formed into a columnar shape as a whole, and is detachably fit into a ring 28 in the front of the lower chassis 25.

The independent unit 27 of the control device is formed into a flat and columnar shape as a whole, and is detachably fit into a recessed portion 29 at the center potion of the lower chassis 25.

The abovementioned operation device, propulsion device, and control device are component devices each of which fulfills a particular function, is assembled in one component, and is referred to as "single-function module" in the present specification.

The single-function module is contained in a waterproof-pressure-resistant case, and is configured into a physically independent unit. The physically independent unit is referred to as an "independent unit" in the present specification.

Figure 9:
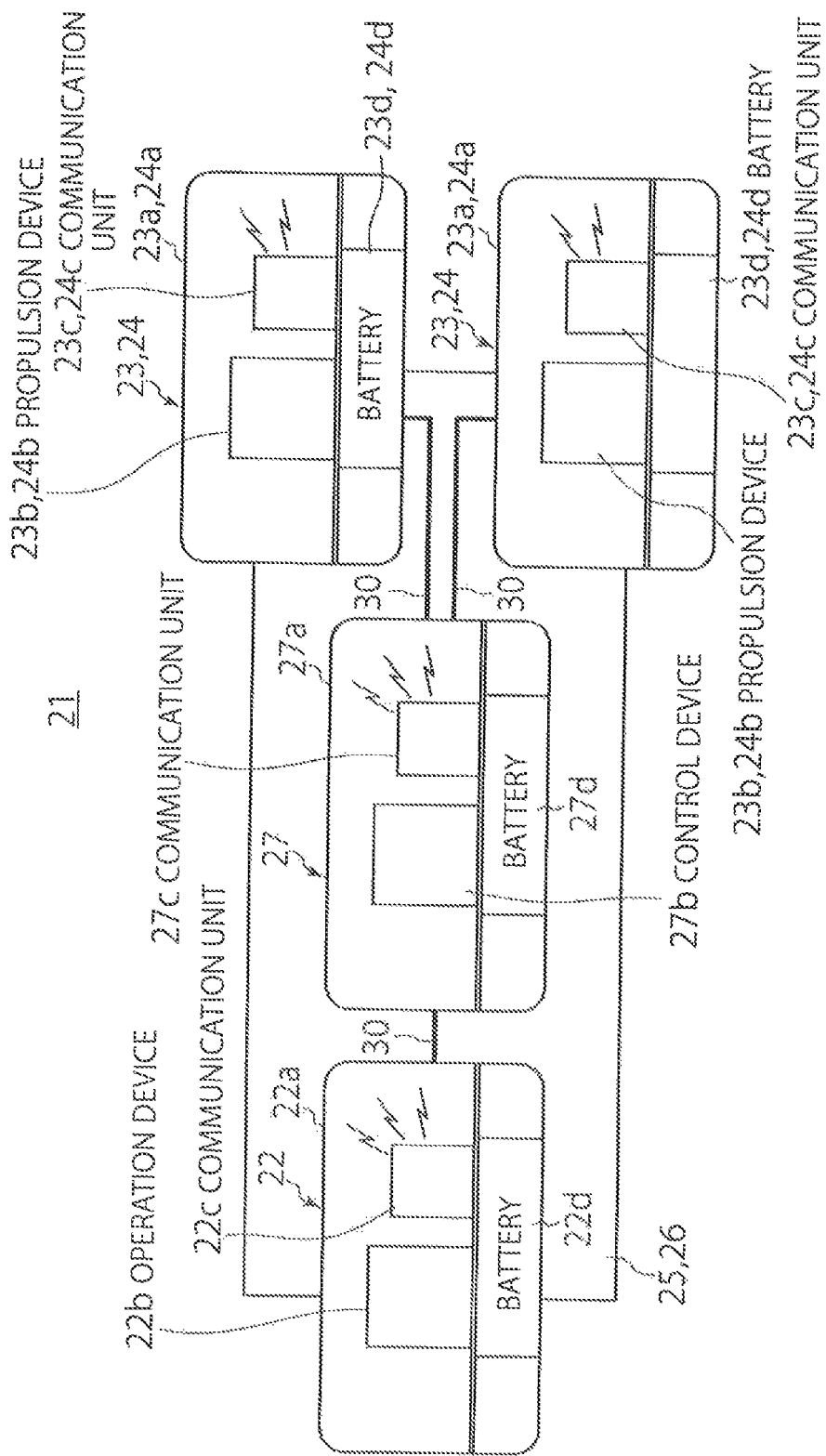
FIG. 9 is a block configuration diagram of an underwater robot according to one embodiment of the present invention.

FIG. 9 shows a block configuration of the underwater robot 21. In FIG. 9, the independent units 23 and 24 of the propulsion devices are illustrated as two blocks for conceptual illustration.

As shown in FIG. 9, the independent unit 22 of the operation device contains, in addition to an operation device 22b, communication unit 22c that can perform transmission and reception, and a battery 22d, in a waterproof-pressure-resistant case 22a.

The independent units 23 and 24 of the propulsion devices contain likewise, in addition to propulsion devices 23b and 24b, communication unit 23c and 24c that can perform transmission and reception, and batteries 23d and 24d, in waterproof-pressure-resistant cases 23a and 24a, respectively.

The independent unit 27 of the control device also contains likewise, in addition to a control device 27b, communication unit 27c, and a battery 27d, in a waterproof-pressure-resistant case 27a.

These independent units 22, 23, 24, and 27 are attached to the lower chassis 25 and the upper chassis 26, and the independent units 22, 23, 24, and 27 are connected to one another by non-conductive propagation media 30.

At least portions of the independent units 22, 23, 24, and 27 that are in contact with the propagation media 30 are preferably made of non-conductive material (e.g., synthetic resin, rubber, glass, or ceramic). As the synthetic resin, for example, polyvinyl chloride, polyethylene, polypropylene, acrylic, polyacetal, polycarbonate, Bakelite (R), or polyester can be used. As the rubber, natural rubber or synthetic rubber (e.g., styrene butadiene rubber, acrylonitrile butadiene rubber, polychloroprene rubber, ethylene propylene rubber, or methyl vinyl silicone rubber) can be used. In such a manner, the received radio wave intensity can be enhanced by configuring the contact portions using such a non-conductive material.

The propagation media 30 can be laid on the lower chassis 25 and the upper chassis 26 as appropriate.

The propagation medium 30 is made of non-conductive material such as synthetic resin, rubber, glass, or ceramic, for example.

As the synthetic resin, for example, polyvinyl chloride, polyethylene, polypropylene, acrylic, polyacetal, polycarbonate, Bakelite (R), or polyester can be used.

In addition, as the rubber, natural rubber or synthetic rubber (e.g., styrene butadiene rubber, acrylonitrile butadiene rubber, polychloroprene rubber, ethylene propylene rubber, or methyl vinyl silicone rubber) can be used. In addition, as the glass, for example, glass epoxy can be used.

The propagation media 30 are connected to the waterproof-pressure-resistant cases 22a, 23a, 24a, and 27a so as to be brought into contact with and fixed to the outsides thereof, without making a hole in the waterproof-pressure-resistant cases 22a, 23a, 24a, and 27a.

Figure 10:
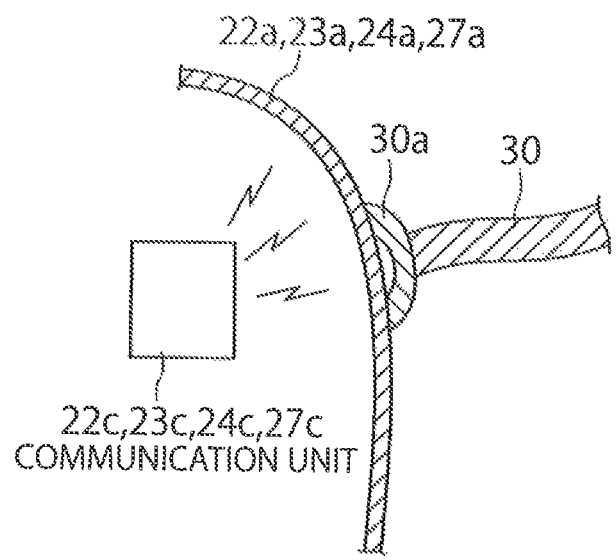
FIG. 10 is a diagram illustrating a connection example of a propagation medium.

FIG. 10 shows one example of fixing the propagation medium 30.

In the example of FIG. 10, one end portion of the propagation medium 30 is formed into a suction cup 30a, and the propagation medium 30 is fixed to each of the waterproof-pressure-resistant cases 22a, 23a, 24a, and 27a such that the suction cup 30a is caused to adhere on the outside thereof.

According to such a fixing method, no hole needs to be drilled in the waterproof-pressure-resistant cases 22a, 23a, 24a, and 27a. That is, the waterproof-pressure-resistant cases 22a, 23a, 24a, and 27a can be each configured to have no structural seam at a portion thereof connected with the propagation medium 30.

Note that the communication unit 22c, 23c, 24c, and 27c do not have to be in contact with the waterproof-pressure-resistant cases 22a, 23a, 24a, and 27a, as shown in FIG. 10.

The underwater robot 21 is disposed underwater as a whole in use, electrical signals are wirelessly transmitted/received by the communication unit 22c, 23c, 24c, and 27c inside the independent units, the electrical signals are propagated through the waterproof-pressure-resistant cases 22a, 23a, 24a, and 27a and the propagation media 30, propagated to the waterproof-pressure-resistant cases 22a, 23a, 24a, and 27a of the other independent units to be wirelessly transmitted to the inside thereof, and intercepted by the communication unit 22c, 23c, 24c, and 27c of the other the independent units.

As can be understood from the experimental results of the aforementioned FIG. 3A and FIG. 3B, according to the present invention, the propagation medium 30 prevents communications between the independent units from being subjected to the attenuation in water, which allows the communication between the independent units in a practical-size underwater robot.

As shown in FIG. 9, in the underwater robot 21 of the present invention, the communication unit 27c of the independent unit 27 of the control device and the communication unit: 22c, 23c, and 24c of the other independent units 22, 23, and 24 communicate with each other, which allows the control device 27b to control the other single-function modules 22b, 23b, and 24b so as to control the whole operations of the underwater robot 21.

The underwater robot 21 of FIG. 9 is excellent in pressure-resistant and water-resistant because there is no telecommunication cable, and the waterproof-pressure-resistant cases have no hole for the cable. In addition, the underwater robot 21 has an advantage in that the suction cup 30a makes the propagation medium 30 easy to attach/detach.

Furthermore, according to the present invention, the independent units can be constructed as totally independent units. The term "totally independent" means that there is no connection cable being the propagation medium and no power cable for supplying power.

Figure 11:
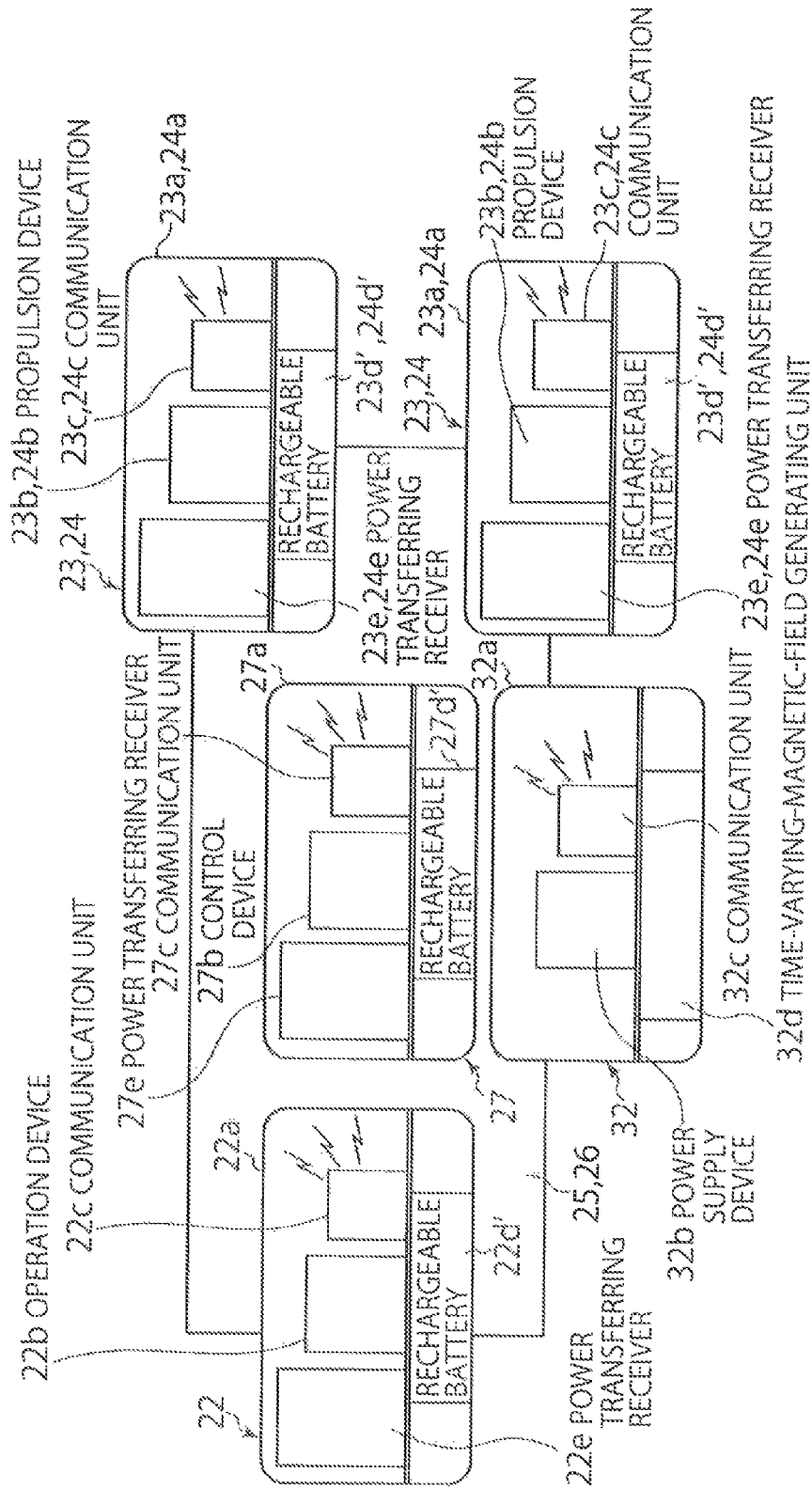
FIG. 11 is a block configuration diagram of an underwater robot including a power supply device for wirelessly supplying power.

FIG. 11 shows a block diagram of an underwater robot in which the independent units are each totally independent.

For ease of understanding, in FIG. 11, parts identical to those of FIG. 9 are denoted by the same reference numerals, and redundant explanations thereof will be omitted.

In an underwater robot 31 shown in FIG. 11, there is no connection cable being a propagation medium (the propagation medium 30 in FIG. 9), and instead, chassis 25 and 26 are made of non-conductive material such as synthetic resin, rubber, glass, and ceramic.

As the synthetic resin, for example, polyvinyl chloride, polyethylene, polypropylene, acrylic, polyacetal, polycarbonate, Bakelite (R), or polyester can be used.

In addition, as the rubber, natural rubber or synthetic rubber (e.g., styrene butadiene rubber, acrylonitrile butadiene rubber, polychloroprene rubber, ethylene propylene rubber, or methyl vinyl silicone rubber) can be used. Furthermore, as the glass, for example, glass epoxy can be used.

In addition, in the underwater robot 31 shown in FIG. 11, the independent units each include a rechargeable battery instead of a battery, and the underwater robot 31 includes an independent unit 32 of a power supply device for supplying power to the independent units.

The underwater robot 31 can operate for a long time by using a high-capacity power supply device, and moreover, includes no power cable for supplying power.

Specifically, the independent unit 32 of the power supply device contains, inside a waterproof-pressure-resistant case 32a, a power supply device 32b, communication unit 32c, and time-varying-magnetic-field generating unit 32d for generating a time-varying magnetic field.

In contrast, the independent unit 22 of the operation device includes a rechargeable battery 22d' and a power transferring receiver 22e.

In addition, the independent units 23 and 24 of the propulsion devices include rechargeable batteries 23d' and 24d' and power transferring receivers 23e and 24e, respectively.

The independent unit 27 of the control device includes a rechargeable battery 27d' and a power transferring receiver 27e.

According to the underwater robot 31 of the present embodiment, since electrical signals from the communication unit 22c, 23c, 24c, 27c, and 32c of the independent units are exchanged through the chassis 25 and 26 made of non-conductive material, a connection cable being the propagation medium can be omitted.

Furthermore, power can be supplied to the single-function modules without power cables, as follows.

That is, the independent unit 32 of the power supply device generates a magnetic field that is varied by the time-varying-magnetic-field generating unit 32d following an instruction from the control device 27b via the communication unit 32c.

On the other hand, the power transferring receivers 22e, 23e, 24e, and 27e of the independent units each convert the time-varying magnetic field into power, and each supply the power directly or indirectly to the single-function modules.

Indirectly supplying the power to the single-function modules means that the power received by the power transferring receivers is charged to the rechargeable batteries 22d', 23d', 24d', and 27d', and the power is supplied to the single-function modules by the rechargeable batteries 22d', 23d', 24d', and 27d'.

According to the underwater robot 31 of the present embodiment, the independent units can perform communication and can be supplied with power, by being merely fit into the chassis 25 and 26.

For this reason, the independent units are extremely easy to replace. That is, since the independent units are not connected by telecommunication cables, connection cables being the propagation media, or power cables, the independent unit may be simply replaced.

Furthermore, the independent unit 32 of the power supply device can be easily replaced because the power supply device is also not connected to the independent units by power cables.

Hence, according to the underwater robot 31, the independent unit 32 of the power supply device can be simply replaced to meet an underwater operation time or an operation load.

Furthermore, when the independent unit 32 of the power supply device is made into a unit that can supply power for a certain period of time and a plurality of units of such power supply devices are prepared, the power supply devices can be increased or decreased to meet an operation time or a load of the underwater robot.

In addition, since the independent units are not connected to one another and easy to replace, in the underwater robot 31 of the present embodiment, the independent unit 27 of the control device can be replaced for different operation purposes.

That is, depending on operation purposes, the independent unit 27 of the control device can be easily replaced with the independent unit of the other control device that has a different control program installed therein. Needless to say, the independent unit of the other single-function module can be also easily replaced depending on the operation purposes.

This allows one underwater robot to be used for a plurality of operation purposes as appropriate.

Figure 12:
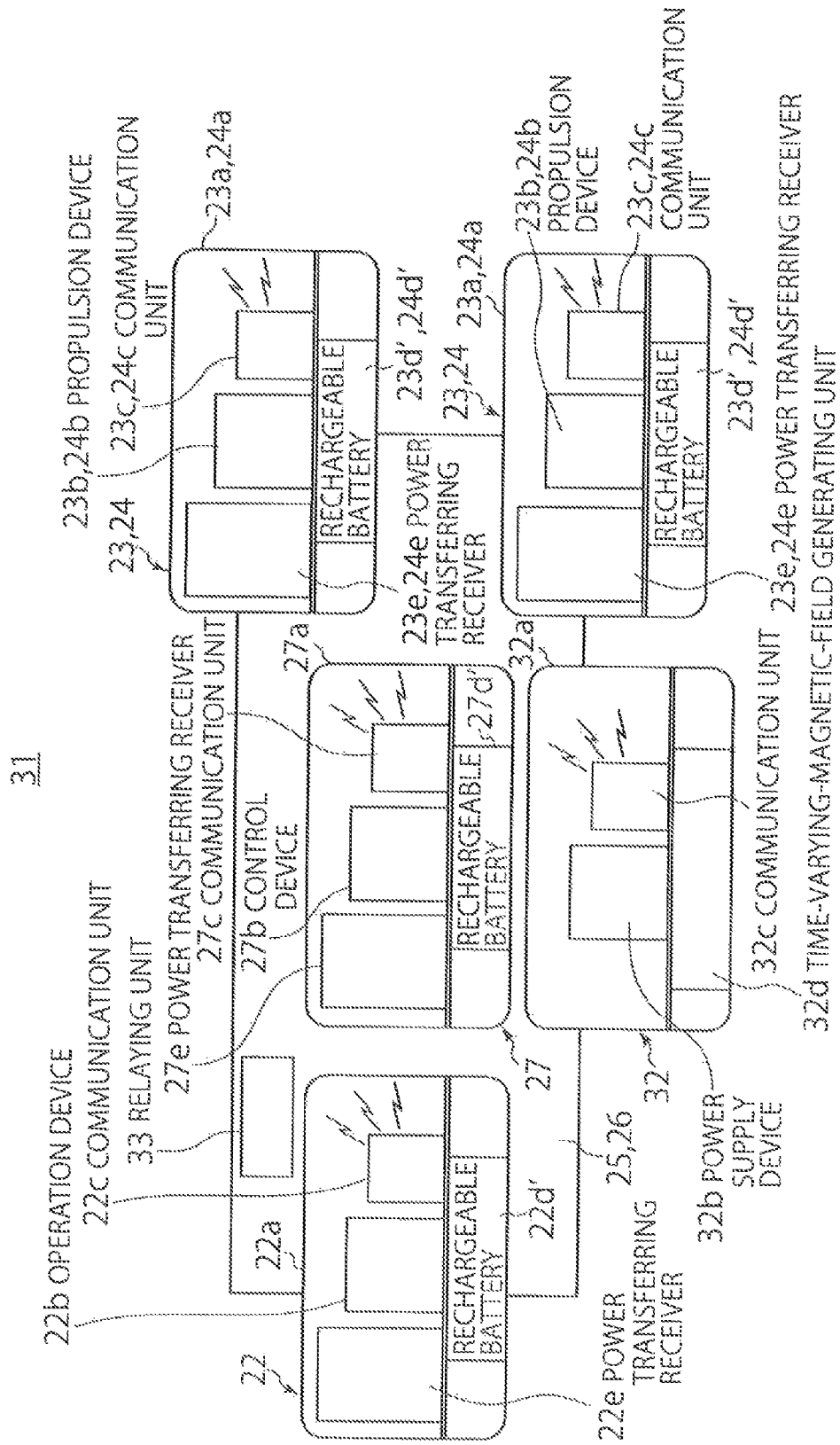
FIG. 12 is a block configuration diagram of an underwater robot including a chassis that functions as a propagation medium.

FIG. 12 shows a modification of the underwater robot 31 of FIG. 11.

The underwater robot of FIG. 12 includes a relaying unit 33, which is only a difference from the underwater robot 31 of FIG. 11.

The relaying unit 33 has a function of receiving, amplifying, and transmitting an electrical signal.

According to the underwater robot 31 of this modification, by providing the relaying unit 33 in the chassis in places, communication functions of the single-function modules are made more reliable.

Note that, in the example of FIG. 12, the relaying unit 33 is provided in the chassis 25 and 26, but connection cables being the propagation media may be used and the relaying unit 33 may be provided to the propagation media in places.

Although some of the embodiments of the present invention have been described, such embodiments are presented as examples and are not intended to limit the scope of the invention. The embodiments can be implemented in various other modes, where various omissions, replacements, and changes can be made within a scope not deviating from the gist of the invention. Such embodiments and modifications are included in the scope and gist of the invention, and are included in a scope equivalent to the invention described in the claims.

Reference Signs List 1 underwater communication system
2 hermetically-sealed structure
3 hermetically-sealed structure
4 propagation medium
4a suction cup
5 shell body
6 moving unit
7 operation unit
8 information-processing device
9 transmission unit
10 reception unit
11 hermetically-sealed structure
12 receiving base
13 propagation medium
14 floating body
15 reception unit
16 hermetically-sealed structure
17 propagation medium
18 relaying unit
19 relaying unit
21 underwater robot
22 independent unit of operation device
22a waterproof-pressure-resistant case
22b operation device
22c communication unit
22d battery
22d' rechargeable battery
22e power transferring receiver
23 independent unit of horizontal propulsion device
23a waterproof-pressure-resistant case
23b propulsion device
23c communication unit
23d battery
23d' rechargeable battery
23e power transferring receiver
24 independent unit of vertical propulsion device
24a waterproof-pressure-resistant case
24b propulsion device
24c communication unit
24d battery
24d' rechargeable battery
24e power transferring receiver
25 lower chassis
26 upper chassis
27 independent unit of control device
27a waterproof-pressure-resistant case
27b control device
27c communication unit
27d battery
27d' rechargeable battery
27e power transferring receiver
28 ring
29 recessed portion
30 propagation medium
30a suction cup
31 underwater robot
32 independent: unit of power supply device
32a waterproof-pressure-resistant case
32b power supply device
32c communication unit
32d time-varying-magnetic-field generating unit
33 relaying unit

The invention claimed is:

1. An underwater communication system comprising:
a hermetically-sealed structure that includes a shell body having a watertight structure and that is disposed underwater;
a non-conductive propagation medium that includes one end portion being in contact with an outside of the shell body; and
a transmitting/reception unit is arranged in the hermetically-sealed structure and that wirelessly transmits and/or wirelessly receives a radio wave propagated through the propagation medium.

2. The underwater communication system according to claim 1, wherein the one end portion of the propagation medium is fixed to the shell body, without making a hole in the shell body of the hermetically-sealed structure.

3. The underwater communication system according to claim 2, wherein the propagation medium includes a suction cup integrally formed at the one end portion, and the propagation medium is fixed to the shell body in such a manner that the suction cup is caused to adhere on an outside of the shell body.

4. The underwater communication system according to claim 1, wherein the propagation medium is in closely contact with the shell body of the hermetically-sealed structure, in the entire end surface of the one end portion.

5. The underwater communication system according to claim 4, wherein the propagation medium has flexibility, and deforms in conformity with an outside shape of the shell body so as to be in closely contact with the shell body.

6. The underwater communication system according to claim 1, wherein at least a portion of the shell body of the hermetically-sealed structure that is in contact with the propagation medium is made of non-conductive material.

7. The underwater communication system according to claim 6, wherein the non-conductive material is made of synthetic resin, rubber, glass, or ceramic.

8. The underwater communication system according to claim 1, further comprising:
a reception unit provided in the vicinity of an other end portion of the propagation medium protruding from the water surface,
wherein the reception unit receives, from the other end portion of the propagation medium, the radio wave that wirelessly transmitted by the transmitting/reception unit and that is propagated through the shell body of the hermetically-sealed structure and the propagation medium.

9. The underwater communication system according to claim 1, further comprising:
a second hermetically-sealed structure that includes a shell body having a watertight structure and that is disposed underwater, an other end portion of the propagation medium being in contact with an outside of the shell body of the second hermetically-sealed structure, and
a reception unit that is contained inside the second hermetically-sealed structure; and
wherein the reception unit wirelessly receives, from the other end portion of the propagation medium, the radio wave that is wirelessly transmitted by the transmitting/reception unit and that is propagated through the shell body of the hermetically-sealed structure and the propagation medium, via the shell body of the second hermetically-sealed structure.

10. The underwater communication system according to claim 9, wherein the other end portion of the propagation medium is fixed to the shell body without making a hole in the shell body of the second hermetically-sealed structure.

11. The underwater communication system according to claim 10, wherein the propagation medium includes a suction cup integrally formed at the other end portion, and the propagation medium is fixed to the shell body of the second hermetically-sealed structure in such a manner that the suction cup is caused to adhere on the outside of the shell body.

12. The underwater communication system according to claim 9, wherein the propagation medium is in closely contact with the shell body of the second hermetically-sealed structure in the entire end surface of the other end portion.

13. The underwater communication system according to claim 12, wherein the propagation medium has flexibility, and deforms in conformity with an outside shape of the shell body so as to be in closely contact with the shell body of the second hermetically-sealed structure.

14. The underwater communication system according to claim 9, wherein at least a portion of the shell body of the second hermetically-sealed structure that is in contact with the propagation medium is made of non-conductive material.

15. The underwater communication system according to claim 1, wherein the propagation medium is made of synthetic resin, rubber, glass, or ceramic.

16. The underwater communication system according to claim 1, wherein electrical power is wirelessly supplied through the propagation medium.

17. The underwater communication system according to claim 1, further comprising:
 a time-varying-magnetic-field generating unit that is contained inside the hermetically-sealed structure; and
 a power transferring receiver that converts a time-varying magnetic field into power, the time-varying magnetic field being generated by time varying-magnetic-field generating unit and propagated through the shell body of the hermetically-sealed structure and the propagation medium, and received from the other end portion of the propagation medium.

* * * * *